April 21, 1964 N. K. PERKINS 3,129,494

METHOD AND APPARATUS FOR WINDING MAGNETIC CORES

Filed July 6, 1960 8 Sheets-Sheet 1

INVENTOR
NORWOOD K. PERKINS

BY Kenneth P. Johnson
ATTORNEY

METHOD AND APPARATUS FOR WINDING MAGNETIC CORES

Filed July 6, 1960

April 21, 1964 N. K. PERKINS 3,129,494

METHOD AND APPARATUS FOR WINDING MAGNETIC CORES

Filed July 6, 1960 8 Sheets-Sheet 6

United States Patent Office 3,129,494
Patented Apr. 21, 1964

3,129,494
METHOD AND APPARATUS FOR WINDING MAGNETIC CORES

Norwood K. Perkins, Lexington, Ky., assignor to International Business Machines Corporation, New York, N.Y., a corporation of New York Filed July 6, 1960, Ser. No. 41,165
10 Claims. (Cl. 29—155.5)

This invention relates generally to the threading of pierced or apertured articles and more particularly to the threading of apertured magnetic cores in two dimensional planes or arrays.

Magnetic cores are extensively used in modern high speed electronic computers in a variety of circuits such as shift registers, switching circuits, memory circuits and the like. These circuits usually require that a series of cores be linked by a common winding or filament passing through the core apertures. The manner in which a plurality of cores is threaded depends, of course, upon the circuit in which the cores are employed; the circuit may require that a plurality of cores be linked in series or that the cores be arranged in a two dimensional matrix. Core circuits may require also a variable number of windings linking each core in the plane.

One of the primary uses of magnetic cores is in computer memory units. Here a plurality of cores is arranged in two dimensional planes and several planes are often stacked to form a memory unit. A core plane is usually composed of magnetic cores arranged in parallel rows along each of two coordinates so that each core is common to two intersecting rows. Filaments serving as control and sense windings are threaded through the rows of core apertures along both coordinates so that each core is linked by several of the filaments.

The formation of core memory units presents a serious problem since the assembly of the cores and filaments is tedious, time-consuming and subject to error. Cores are, because of their size (often having an overall dimension of a few hundreths of an inch), difficult to handle and to support during the threading operation. Threading is difficult because a needle to which a filament is attached must be passed through the tiny core apertures from either of two coordinate directions, and several filaments must be inserted. The assembly problem has been intensified since the present trend is to use cores of smaller dimensions and to increase the number of core planes employed in a computer. Furthermore, cores having multiple apertures have been developed and are beginning to receive extensive use; these cores increase the threading difficulty because corresponding apertures in the core rows or plane must be linked by a common filament and there is likelihood of erroneous or entangled threading.

Heretofore, a matrix of cores has been supported as a plane for threading by placing the cores in individual pockets cut in a solid block of material such that the core apertures are aligned midway between the two coordinate directions. Grooves interconnecting the apertures are formed in the block to properly guide the threading needle. Another method of assembly is to mechanically form individual rows of threaded cores, then subsequently to combine several of these assembled rows as a matrix and to insert the remaining filaments to interconnect the combined rows along the other coordinate.

The present invention provides an individual supporting member for each core with each member rotatable to fully expose the minute core apertures along either of two coordinate directions to permit rapid insertion of the threading needle and filament. A plurality of these members are arranged as a two dimensional matrix, and a core matrix can be completely threaded without intermediate removal of a partially assembled plane. Temporary guide channels for the threading needle are formed in either coordinate direction interconnecting the core apertures to insure that each aperture is properly threaded. This invention further makes one group of supporting members movable as a unit within fixed limits, with respect to the remaining members, so that a winding may be easily threaded through pairs of coordinate rows in a figure eight pattern to cause the half-select signals of one group of cores to cancel out those signals in the remaining group.

Accordingly, a principal object of this invention is to provide an improved method and device for threading magnetic cores.

It is another principal object of this invention to provide a device for individually supporting magnetic cores for alignment along either of two coordinate directions and to fully expose the core apertures when the cores are being threaded.

Another principal object of this invention is to provide a device for threading a magnetic core array in which temporary guide channels are formed interconnecting corresponding apertures of the cores in a desired sequence to aid in accurately inserting the necessary filaments.

Other important objects of this invention are: to provide a device for assembling a magnetic core array so that the half-select signals of half of the cores counteract the half-select signals of the remaining cores; to provide a method and apparatus for threading magnetic cores having multiple apertures to form a two dimensional array; to provide a device for individually supporting magnetic cores during the complete threading operation without the necessity of removal of a partially complete array; and to provide a device for maintaining the magnetic cores during assembly in substantially the same relationship to one another that the cores will have in the ultimate core array.

In accordance with the foregoing objects, this invention provides a plurality of rotatable core supporting members arranged in a two dimensional matrix of intersecting coordinate rows. Each member holds a single core, having one or more apertures, in a manner to expose all apertures for threading. In a preferred embodiment, a rotating means operates in combination with the supporting members to turn them so that the cores are aligned with their apertures fully exposed, for example, along either of two coordinates as desired. The supporting members can be rotated individually or simultaneously, clockwise or counterclockwise, so that the threaded filaments can be looped about a core in any of several configurations. A guide means cooperates with the supporting members in a dual capacity to aid in seating the loose cores in their respective members and to form temporary guide channels interconnecting the rows of apertures so that the filaments may be accurately threaded through the seated cores. Shimming means are provided to exactly align the guide means with the core apertures and to adjust the guide channels for proper interconnection of a particular series of corresponding apertures when the cores each contain several apertures. One group of the supporting members of the matrix is movable as a unit within fixed limits relative to the remaining members to form new coordinate rows; this permits one group of cores to be threaded on a common filament in a sense opposite to the remaining cores so that during subsequent operation of the core plane the half-select signals are cancelled. Alignment means limit the extent of the relative movement of the groups of supporting members and accurately form new temporary coordinate rows.

A feature of this invention is that the supporting members contact only a portion of the periphery of the cores supported thereon so that completely threaded cores can be easily removed without entanglement of the filaments.

Because of this novel supporting feature, the invention is not limited to cores of a single configuration, and the incorporation of supporting mass in the array is eliminated. Another feature of this invention is that the apparatus can be partially disassembled to conveniently attach a core frame to the threaded array prior to the removal of the array.

The foregoing and other objects, features and advantages of the invention will be apparent from the following more particular description of a preferred embodiment of the invention, as illustrated in the accompanying drawings.

Figure 1:
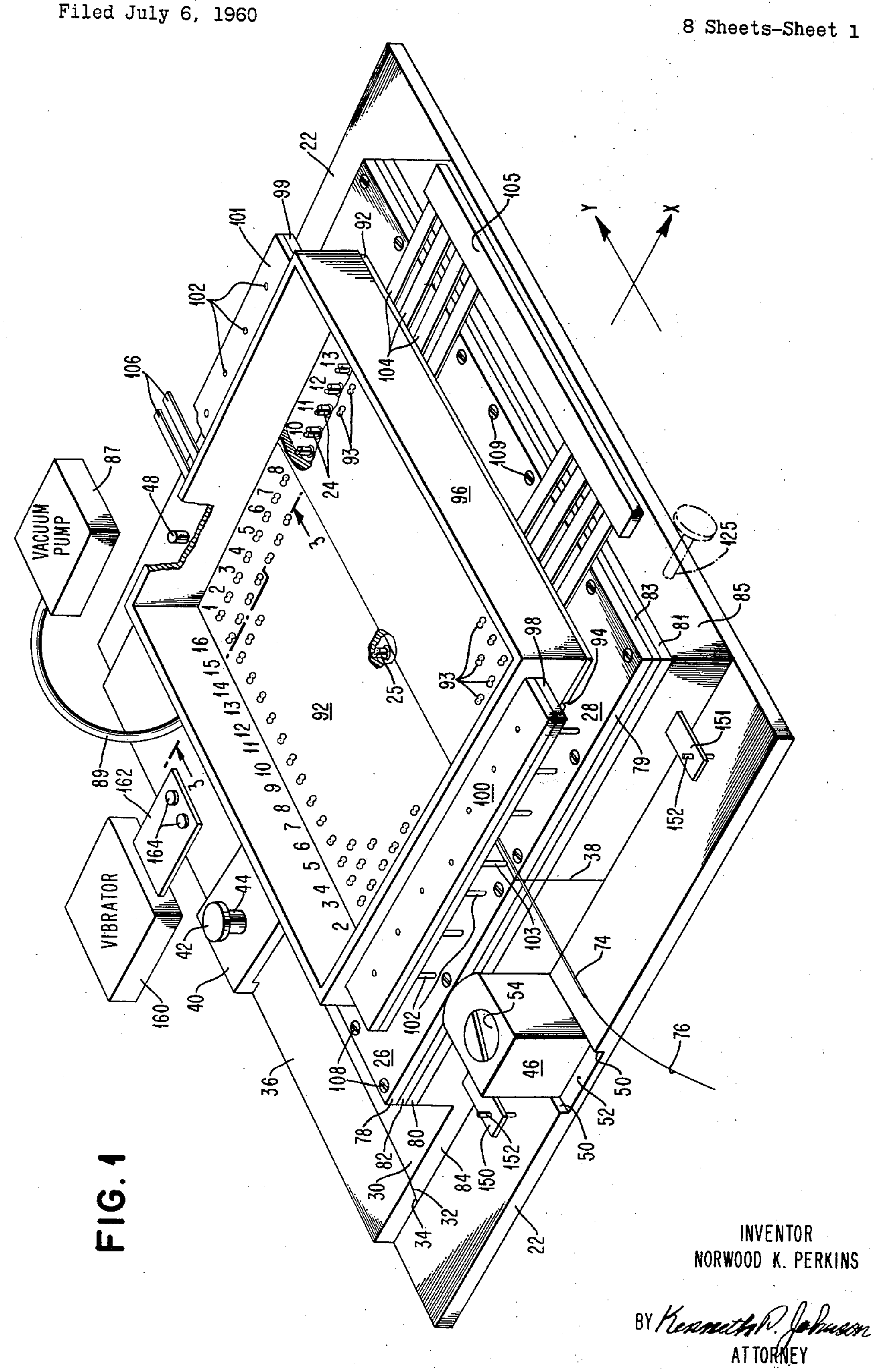
FIGURE 1 is a perspective cut-away view of one embodiment of the core winding device.
Figure 2:
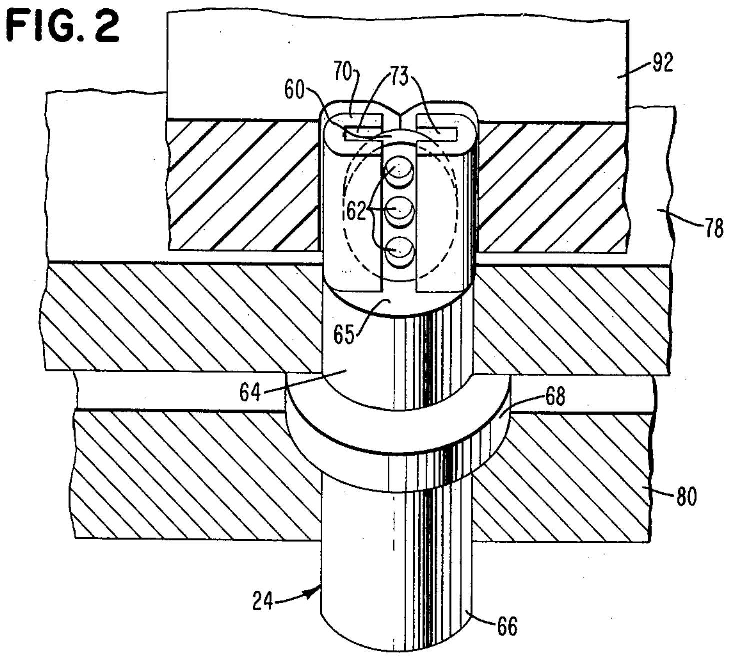
FIGURE 2 is a sectional perspective view of one of the core supporting spindles of the device.

With reference to FIG. 1, the invention consists generally of a plurality of spindles 24 arranged as a matrix of intersecting coordinate rows so that each spindle forms an intersection of two coordinate rows. Each spindle supports an individual apertured core such as core 60 with apertures 62 (FIG. 2). The spindles can be rotated individually or collectively to align their supported cores with the apertures fully exposed in any direction desired so that a filament 76 may be threaded by a needle 74 through the aligned rows of core apertures. A complete core plane requires individual windings threaded through the apertures in each coordinate direction. For example, a bias or B winding, an inhibit or Z winding, and a Y-select winding may be necessary along the Y coordinate, and an X-select winding and a sense or S winding may be necessary along the X coordinate. After the windings have been inserted through the apertures in the Y direction, the cores and spindles may be rotated to form rows of apertures along the X coordinate for insertion of the remaining windings. Pins 102 and 103 are used to preserve an excess amount of winding at the ends of the rows being threaded so that there is sufficient winding to allow for spindle and core rotation when the apertures are aligned along the other coordinate. As the winding exits from one row of apertures, it is passed around the pins before being reinserted in the next row threaded. The pins and their support blocks 100 and 101 can be removed from the fence 96 when desired.

Figure 4:
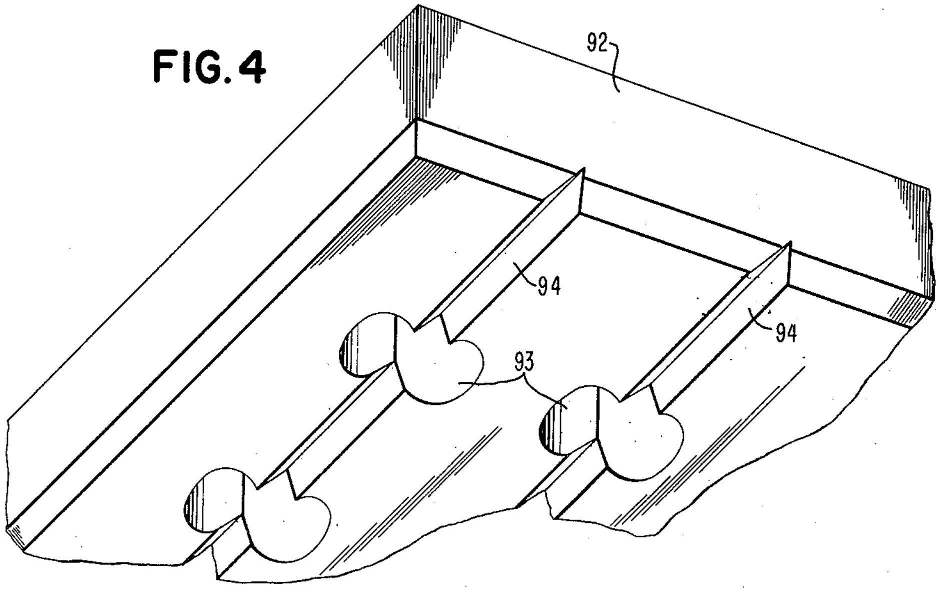
FIGURE 4 is a partial perspective view of the guide piece employed in the device.

Guide channels for the threading needle are formed interconnecting the core apertures of each row by placing a guide piece 92, having grooves 94 (FIG. 4) in its underside, over the spindles. The guide piece fits over the spindles so that the grooves coincide with the core apertures along either coordinate. Spacers 104 and divider strips 106 are employed under the guide piece and between the rows of spindles to vertically align the grooves of the guide piece and the core apertures. The guide piece 92 and fence 96 can be rotated from the positions shown so that the pins 102 and 103 may be of use when the windings are placed through the cores in the other coordinate.

The invention provides for inserting a single sense winding linking all cores, but with half of the cores threaded opositely on the winding relative to the other cores so as to automatically cancel any half-select signals in the entire plane after the plane is ultimately installed for use. This is done by mounting half of the spindles on a movable base assembly 26 and half of the spindles on a stationary base assembly 28. Base assembly 26 is movable along the Y coordinate in either direction between adjustable alignment stop 46 and fixed limit stop 48, and is guided by flange 36. These stops permit base assembly 26 to move in either direction the distance equivalent to that between two adjacent X rows of spindles. The sense winding may be passed from left to right through an X row of apertures while the base assembly 26 is at one extreme of travel, and then passed through an X row adjacent the exit row on base assembly 28 while the base assembly 26 is at the opposite extreme of travel. When this operation is continued for all X rows, half of the cores are linked in one sense and half in the opposite sense on the same winding. Clamp 40 is used to secure base assembly 26 at the desired location.

Loose cores may be easily loaded into their respective spindles by placing guide piece 92 and fence 96 over the spindles and vibrating the entire winding apparatus by means of a vibrator 160 while a vacuum is created at each spindle by a vacuum pump 87. Each spindle has a duct 90 (FIG. 3) connecting its core seat with an evacuated compartment below the spindles. After each spindle contains a core, the fence may be removed and the excess cores brushed away.

In the following detailed description of the invention, a reference to X and Y rows, axes or directions is intended to mean rows of axes parallel to the direction of these coordinates as shown in FIG. 1. The numbering of the coordinate rows of spindles in FIG. 1 is as follows: X rows are numbered in ascending order from the bottom toward the top of the figure; Y rows are numbered in ascending order from the left side toward the right side of the figure.

Referring now with more particularity to FIG. 1, base assemblies denominated generally as 26 and 28, are supported on a base plate 22. The base assemblies serve as a support for a plurality of core supporting members or spindles 24, shown in more detail in FIGS. 2 and 3. In the particular embodiment shown, there are 256 core supporting spindles arranged in a two dimensional 16 x 16 core spindle matrix. Each spindle is spaced equidistant from adjacent spindles in the coordinate directions, and each is rotatably mounted so that the spindles may be turned in either direction from the position shown. Base assembly 28 is fixed to supporting base plate 22; base assembly 26 is slidable along the Y axis and has a flange portion 30 attached thereto (at its left side in FIG. 1) to aid in positioning base assembly 26. The flange portion has a beveled edge 32 mating with an undercut edge 34 of a guide 36 for a sliding fit, the guide being fixed to plate 22. Thus base assembly 26 may be moved accurately along the Y axis between the edge 38 of base assembly 28 and guide 36. In order to maintain the desired alignment of the spindle rows of base assembly 26 with those of base assembly 28, a clamping device is provided. In this instance, thumb screw 42, having a shoulder 44, extends through plate 40 and is threaded into guide member 36. When thumb screw 42 is tightened, shoulder 44 presses clamp 40 against flange 30. By merely adjusting the thumb screw, base assembly 26 may be moved and clamped at any particular location along the Y axis relative to base assembly 28. The slidable base assembly may be supplied with stops at the two extremes of its travel. For this purpose aligning means in the configuration of a block 46 and a pin 48 are provided. The aligning block 46 is attached to plate 22 and held properly oriented by means of two edges 50 of channel 52 cut in base plate 22. A screw 54 and compression spring thereunder (not shown) may be used to secure the aligning block to the base plate. The compression spring, by bearing against the underside of the screw head and the shoulder of a counterbore within the aligning block, permits the block to be raised slightly to clear channel edges 50 and turned from the position shown so that it is not held in position by the channel 52. The aligning block serves to present two different limits for the travel of base assembly 26. Screw 54, securing the block 46 to the plate 22, is located so as to present the X rows of spindles of base assembly 26 in proper alignment with their corresponding X rows of spindles of base assembly 28 in the position shown. When it is desirable to align the X rows of spindles in base assembly 26 with other than their corresponding X rows of spindles in base assembly 28, aligning block 46 may be lifted and turned 90 degrees, thus providing a new position of alignment of base assembly 26 with base assembly 28. In the illustrated embodiment, the difference between the two limits of travel of the base assembly 26 against the aligning block is equivalent to that between any two adjacent X rows. However, a polyhedral block may be conveniently used to provide other limits. The limit stop 48 at the other extreme of travel is fixed to plate 22 and is not adjustable. Limit stop 48 may also be made adjustable if different limits of travel are necessary. The purpose of the limitation of the travel of base assembly 26 to the various positions just described will be explained hereinafter.

Figures 3, 5, 6, 11:
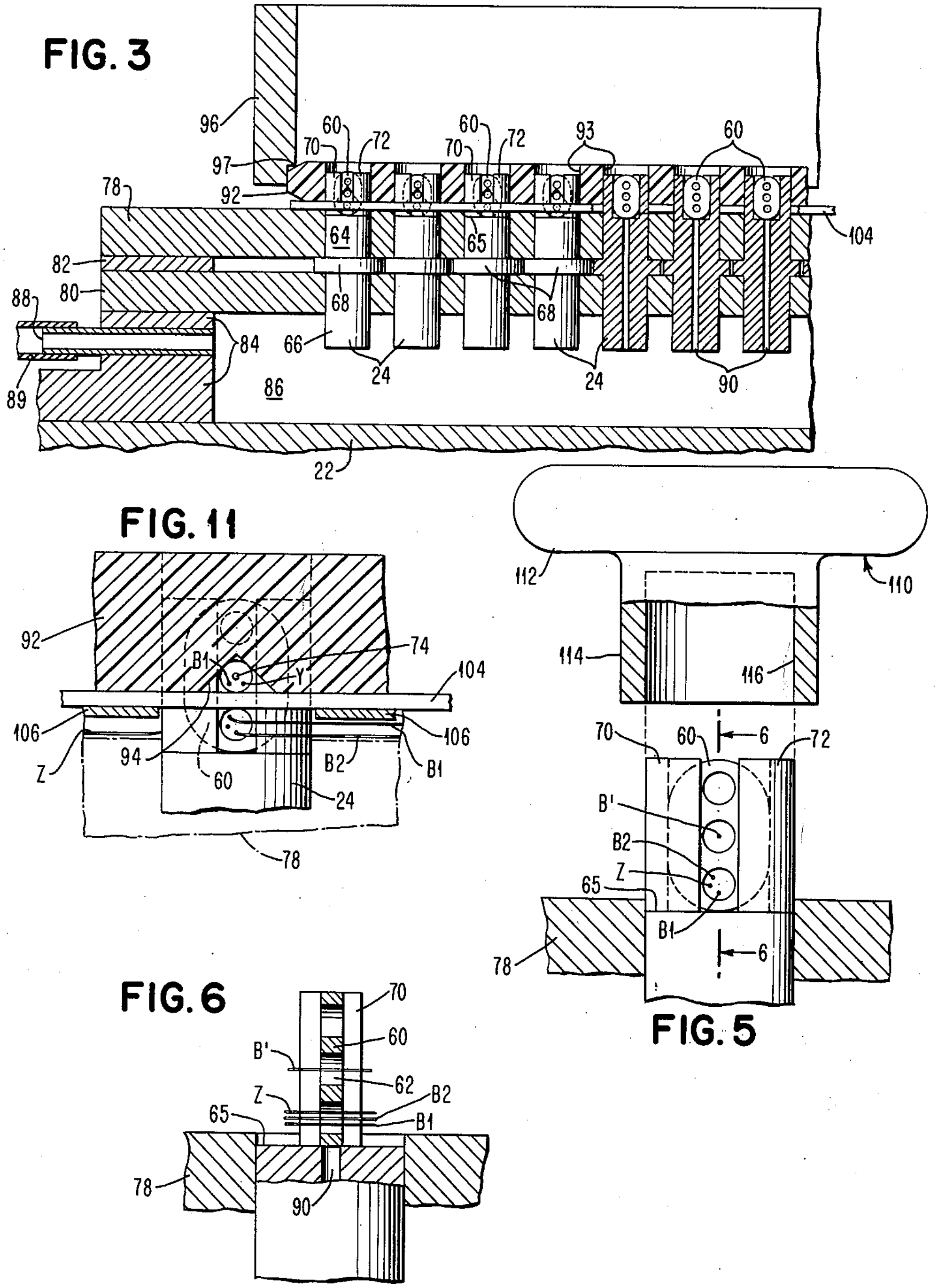
FIGURE 3 is a sectional view taken on line 3—3 of FIG. 1.
FIGURE 5 is a cut-away elevational view of the top end of one of the spindles shown in FIG. 2 and a key used to rotate the spindle.
FIGURE 6 is a partial section of the core and spindle taken on line 6—6 of FIG. 5.
FIGURE 11 is a sectional view of the guide channel and shimming structure of the core winding device.
Figures 7, 8:
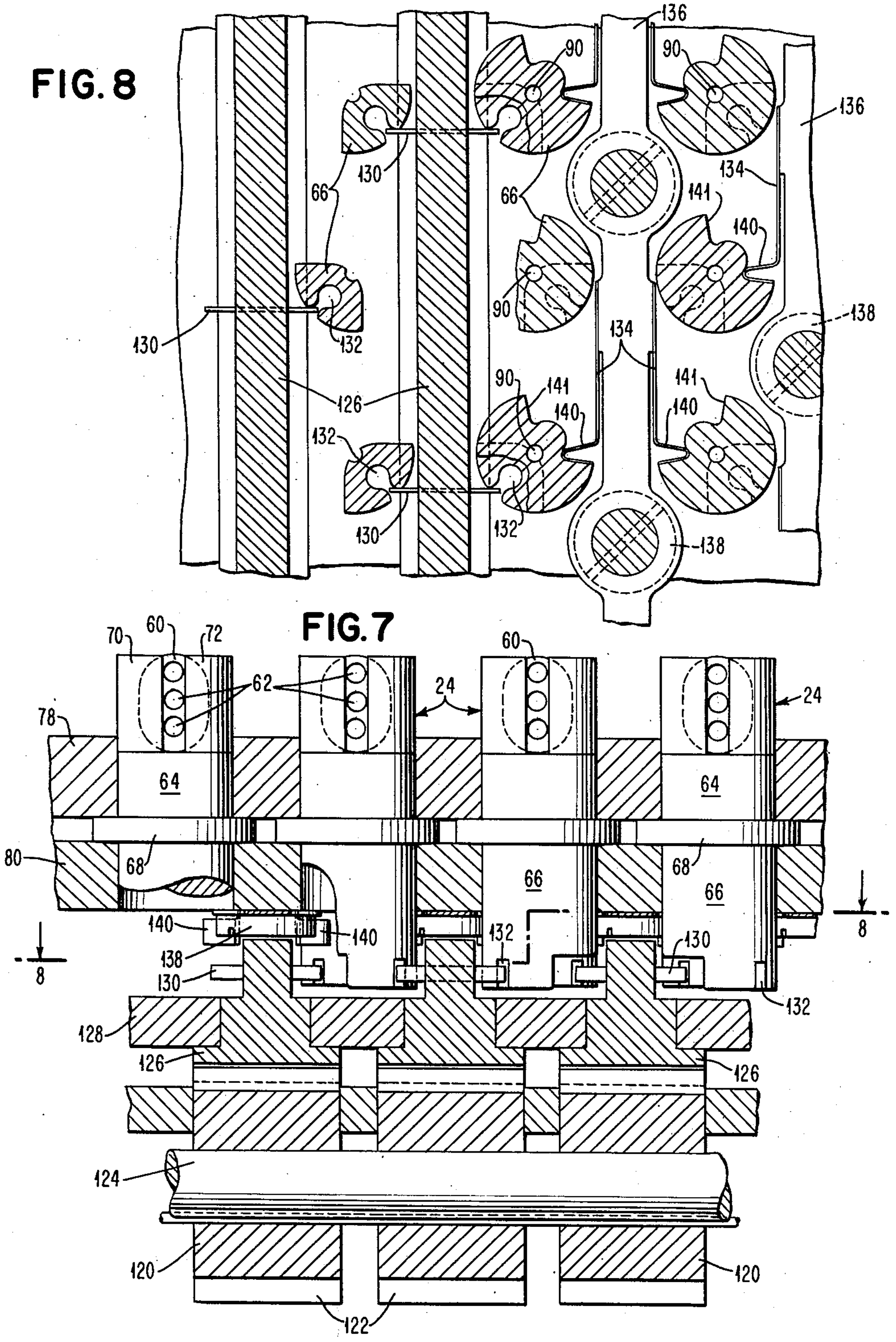
FIGURE 7 is an elevation view partly in section of an alternative mechanism for rotating the spindles of the device in FIG. 1.
FIGURE 8 is a sectional view taken along line 8—8 of FIG. 7.

The core supporting members or spindles 24 for holding the cores 60, which are to be threaded, and the cores themselves are shown in more detail in FIGS. 2, 3, 5 and 6. As can be seen in FIG. 2, the spindle indicated generally as 24 is divided into two portions, an upper portion 64 and a lower portion 66, separated by an annular flange 68. Upper spindle portion 64 supports two guide fingers 70 and 72 fixed to surface 65, and the fingers are spaced from each other at a distance sufficient to permit easy insertion of cores in slots 73 cut in each guide finger. The spacing provides an access to the core aperture 62 for the threading needle 74 and its attached filament 76 (FIG. 1) during core threading. Threading needle 74 is of slightly larger diameter than the filament 76 and is relatively rigid. The length of the needle is sufficient to extend through an entire coordinate row. An operator may use a hollow needle with an inside diameter large enough to insert a filament therethrough, or he may use a solid needle to which a filament is attached, for instance, with solder. Spindles 24 are supported by shoulders 68 between plates 78 and 80 of base assembly 26 and plates 79 and 81 of base assembly 28. Plates 78 and 79 are thicker than the upper spindle portion 64 so that the surfaces of these plates coincide with the bottom edge of the lowermost core aperture when the vertically supported core rests on surface 65. The relative position of the top surface of plate 78 and the lowermost core aperture is illustrated in FIGS. 5, 6 and 7. When the threading needle is passed through the lowermost apertures of the rows of cores, the plate surfaces will act as a lower guide. The relationship of spindles with each other and with a base assembly is shown in FIG. 3.

Spindles 24 are freely rotatable by leaving the proper clearance for shoulder 68 between plates 78 and 80 and plates 79 and 81, through the use of supporting spacers 82 and 83 of the proper thickness (FIGS. 1 and 3). Plates 78, 80 and spacer 82, holding a group of spindles 24, are attached to flanged element 84 with screws 108 to form base assembly 26. Plates 79, 81 and spacer 83, holding another group of spindles 24, are combined with element 85 to form base assembly 28 and are attached to base plate 22 by screws 109. Thus, base assembly 26 is left free to move on base plate 22. Elements 84 and 85 may be of any desired thickness, but a minimum requirement is that space be provided for the ends of the spindles 24 above the plate 22.

The process of loading cores into their respective spindles may be accomplished by individually inserting the cores by hand, but the process is facilitated by the use of vacuum in conjunction with vibration. A vacuum is created at each spindle core seat while the entire winding apparatus is vibrated so that loose cores placed on guide piece 92 above the spindles, are agitated and drawn into their core seats. As shown in FIGS. 1 and 3, each spindle 24 has a duct 90 connecting the core seat between guide fingers 70 and 72 with a compartment 86 below the spindles. The compartment 86 is evacuated by any suitable vacuum pump 87 connected to the compartment by exhaust duct 88 and hose 89. A vibrator 160 is shown schematically attached to base plate 22 by an arm 162 and pins 164. Any suitable vibrator may be used and its use is optional. For example, a vibrator having a surface large enough on which to set the entire core winding apparatus is the most convenient because the winding apparatus could remain situated for the subsequent threading operations after the vibrator is stopped.

Continuing now with FIGS. 1, 2, 3 and 4, there is shown a removable guide piece 92 having apertures 93 that conform closely with the contour of guide fingers 70 and 72 and correspond in location with each spindle. The guide piece is used to facilitate the loading of cores in their respective spindles and is also used in the subsequent threading operation. The guide piece may be of two portions, one for each base assembly, but is preferably a single element for efficient handling. A transparent material such as a clear plastic is best suited for the guide piece to enable the operator to see the core threading needle during the threading operation. Guide piece 92 should have a thickness approximately equal to or greater than the distance the core spindles project above the upper base assembly plates 78 and 79 to facilitate loading loose cores 60 into the guide fingers 70 and 72 of the spindles. During the filament winding operation, guide piece 92 may be removed to permit the spindles to be rotated or to permit base assembly 26 to be moved relative to base assembly 28 as will be explained hereinafter. The guide piece (FIG. 4) is provided with grooves 94 on its underside, which be of an inverted V or U shape. The grooves are so placed as to be coincident with the particular apertures in each row of cores currently being threaded. The grooves are of sufficient depth to guide the threading needle through the core aperture, or of a depth slightly greater than the diameter of the aperture. When the core spindles are turned 90 degrees, guide piece 92 will also be turned the same amount before replacement to align the grooves with the core apertures and because the apertures 93 of the guide piece closely conform to the location of the spindle guide fingers 70 and 72. Guide piece 92 is shown in FIGS. 1, 2, 3, 10 and 11 as being mounted in place over the core spindles 24. The guide piece is easily removable and the sequence in which the guide piece is to be placed over the core spindles or removed will be described later. Several guide pieces having grooves of varied locations may be provided to correspond with the location and configuration of the core apertures being threaded.

Resting on the periphery of guide piece 92 is a fence 96 which is supported above plates 78 and 79 by a lip 97 (FIG. 3) formed by recesses cut in the X ends of the fence. The fence is supported above the bottom of guide piece 92 to permit passage of the threading needle 74 thereunder. Fence 96 has perpendicular sides of sufficient height to contain the cores on the guide piece during vibration of the entire core winding device, and has fixed on its exterior at the two opposite Y ends, brackets 98 and 99 to support pin blocks 100 and 101. Guide pins 102 and single guide pin 103, located at greater distance from the fence than pins 102, are fixed to the pin blocks. Brackets 98 and 99 have holes corresponding to the location of the pins 102 and 103. Thus, the pin blocks with the pins extending downward, may be easily installed or removed from the brackets. It will be seen later that the number of pins 102 which are used at each Y end of the fence will depend upon the size of the spindle matrix being employed for the core winding operation. The function of pins 102 and 103 is to preserve an excess of filament for spindle rotation and will be described in more detail hereinafter.

Spacers 104, shown in FIGS. 1, 3, 10 and 11 in operational position, are used during the core winding operation. These spacers extend the full length of the spindle rows and are placed between adjacent parallel rows at right angles to the grooves 94 of guide piece 92. Not all spacers 104 are shown in FIG. 1 in order to simplify the drawing. A spacer is provided for each space between the parallel rows of spindles 24, and if desired, another may be placed at either outside edge of the matrix. In the particular embodiment shown, seventeen spacers are used. The spacers serve as a shimming means to vertically position the guide piece 92 during the winding operation and as a lower guide for the threading needle 74 (FIG. 1). Spacers 104 are of a width equal to the distance between adjacent rows of core spindles 24 when the guide fingers of the spindle rows are aligned in the same direction and form the broadest spaces between adjacent rows. For convenience in handling, the spacers may be attached to a block 105. The thickness of the spacers depends upon the distance the guide piece must be raised to align grooves 94 with the core apertures being threaded. Sets of spacers, each set being of a different thickness, may be provided so that the proper spacer thickness may be selected for a particular core configuration.

As an alternative to providing numerous sets of spacers of various thicknesses, flexible auxiliary divider strips 106 (FIG. 1) may be employed as an additional shimming means to raise the spacers 104 to the desired level. These strips are similar to the spacers but are of narrower width because they are placed at right angles to the spacers and must fit between the guide finger 70 of one spindle and the guide finger 72 of an adjacent spindle at the narrowest dimension. The thickness of the auxiliary strips is governed by the distance by which the spacers must be raised. Only two auxiliary divider strips have been shown in FIG. 1 for the sake of clarity of that figure. It is contemplated that a strip be provided for each space between spindle rows, but any number may be used as necessary. These auxiliary strips may also serve to depress threaded filaments toward the bottom of their core apertures when a winding is later inserted along another coordinate.

The spindles 24 may be rotated by means of a key 110 as shown in FIG. 5. The key comprises a handle or bow 112 and collar 114, the collar being hollowed out as at 116 to fit over the guide fingers 70 and 72 of each spindle. It is suggested that the alternate core spindles of each row be of one color and the remaining spindles of that row be of another color to aid in identifying which core spindles are to be rotated clockwise and which are to be rotated counterclockwise. FIG. 6 shows a cross-sectional view of the core and spindle in FIG. 5 after it has been rotated 90 degrees.

An alternative spindle rotating mechanism, shown in FIGS. 7 and 8, may be employed to rotate all of the cores in each base assembly simultaneously. When this mechanism is used, it can be seen that the compartment 86 below the spindles must be sufficiently large to accommodate the mechanism as shown in FIG. 7. Elements 84 and 85 may be of a thicker dimension to position the spindles farther from plate 22. This spindle rotating mechanism comprises pinions 120 having teeth 122, the pinions being fixed to a shaft 124. Two rack and pinion assemblies are necessary; one assembly is mounted in base assembly 26 and the other is mounted in base assembly 28. This is required because base assembly 26 is movable relatively to base assembly 28 in the threading operation for the sense winding. The mechanism is shown and described for base assembly 26 since its counterpart for base assembly 28 is essentially identical. Shaft 124 is journaled in the element 84 of spindle base assembly 26. Though not shown, shaft 124 extends through element 84 on the clamp side (FIG. 1) of the spindle base assembly 26 so that an activating knob or lever may be mounted thereon to rotate shaft 124 in either direction. A second shaft 125 (shown in phantom in FIG. 1 and equivalent to shaft 124) for spindle base assembly 28 may extend to the right through element 85 and be accessible under spacer block 105 for rotation. Racks 126 are provided between each two adjacent rows of spindles along the Y axis and the teeth of the racks mate with pinion teeth 122. In the 16 x 16 spindle matrix shown, eight racks are necessary for each spindle base assembly. However, the pinions 120 and the racks 126 of each base assembly adjacent the edge 38 (FIG. 1) are of half width and rotate spindles in only one row, since the two base assemblies 26 and 28 move relative to each other. The racks may be held in alignment by means of a comb 128 supported at the Y ends of each base assembly. The racks likewise may be supported at the Y ends.

As seen in FIGS. 7 and 8, crossbars 130 are fixed to the upper portion of the racks 126; these crossbars are disposed to engage teeth 132 cut in the bottom portions 66 of each spindle 24. When pinions 120 are rotated in a counterclockwise direction, the racks will simultaneously move in an upward direction (FIG. 8) and the crossbars 130 will cause the spindles to rotate. The spindles at each end of a single crossbar will rotate in opposite directions nad in the same row (vertical) alternate spindles will rotate in the same direction. Thus, adjacent spindles in either coordinate direction will rotate oppositely to each other. The racks 126 are moved sufficiently to rotate each spindle 90 degrees.

In order to accurately limit the rotation of the spindles, as shown in FIG. 8, stops in the form of resilient members 134 are provided. These resilient members are mounted on support members 136 secured to the underside of plate 80 by means of screws 138. A limit stop 140, formed in the end of each resilient member 134, engages with a shoulder 141 of each spindle as racks 126 are moved upward in FIG. 8. A crossbar rotates a spindle until shoulder 141 comes in contact with the limit stop 140 on the resilient member. The limit stops are operative during rotation of each spindle in either direction. This assures proper positioning of the spindle at 90 degrees of rotation from the position shown. The resilient members 134 also indirectly serve to limit rack movement.

Figure 10:
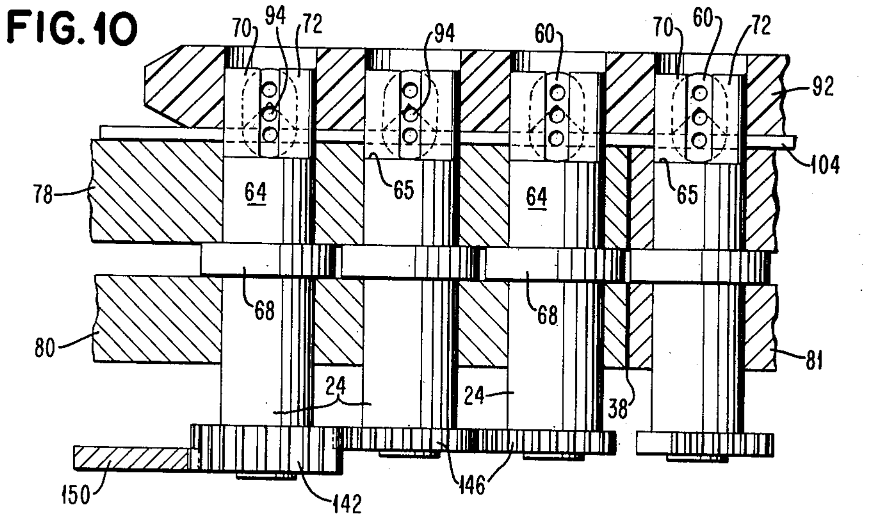
FIGURE 10 is a sectional view taken along line 10—10 of FIG. 9.
Figure 9:
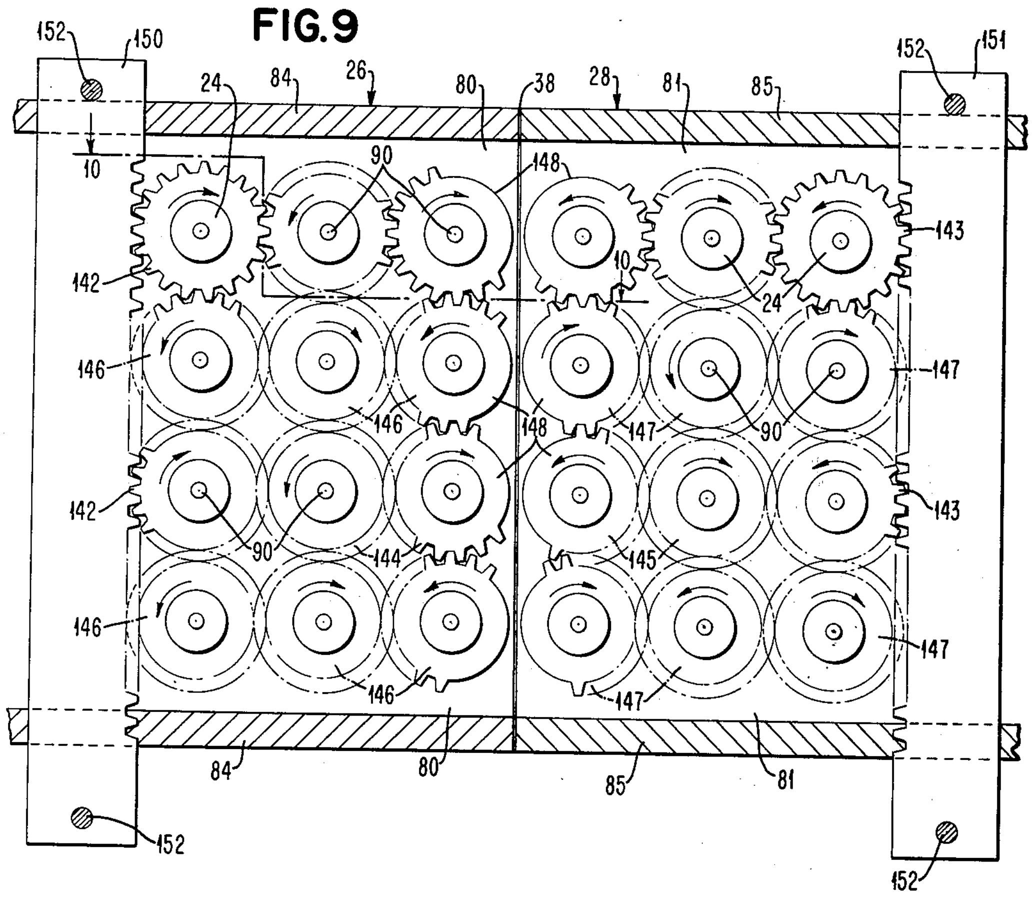
FIGURE 9 is a bottom view of a second alternative mechanism for rotating the spindles of the device in FIG. 1.

A second alternative rotating means for the spindles is shown in FIGS. 9 and 10. In this mechanism each core spindle has fixed to its base a precision spur gear so that generally an individual gear train is provided for each row of spindles along the X axis on each base assembly. However, a single gear serves as the driving means for each of two gear trains along the X axis. Referring first to FIG. 9, there is shown a 4 x 6 spindle matrix. The spindle matrix in this figure has been decreased in size to facilitate the description of the mechanism and to show the relative positions of the necessary elements. This mechanism may, however, be adapted to the 16 x 16 spindle matrix described above or to matrices of other sizes as described. Reference numerals 26 and 28 designate generally the two spindle base assemblies as in the foregoing description. Each spindle of base assembly 26 has attached to its gears 142, 144 or 146; the spindles of base assembly 28 have attached to their lower ends gears 143, 145 or 147. Driving racks 150 and 151 are supported in elements 84 and 85, respectively, so that rack 150 will rotate gears 142 while rack 151 will rotate gears 143. These gears are the only ones in mesh with the racks. Gears 142 and 143 are of double thickness and each drives two gear trains; the primary gear train driven by each is made up of gears 144 and 145, respectively. The secondary gear trains are composed of gears 146 driven by gears 142 and gears 147 driven by gears 143. Since gears 142 and 143 are of double thickness, gears 146 (FIG. 10) and 147 are raised one gear thickness. This arrangement permits placing only a moderate load on gears 142 and 143 and avoids gear interference with the spindle gears on adjacent X rows.

When the core spindles are to be rotated 90 degrees, the racks 150 and 151 are moved by hand, for example, to their opposite extreme of travel (upward in FIG. 9). The racks may be limited to the proper distance of travel by pins 152 located as stops at the proper positions in the ends of the racks exterior to elements 84 and 85. Pins 152 are of sufficient length to contact elements 84 and 85 as the racks are moved to prevent overtravel. Thus, each rack may be moved to its opposite extreme limit of travel each time its core spindles are to be rotated. Racks 150 and 151 are illustrated in FIG. 1 in their relative positions in the core winding apparatus. When the racks are moved from the positions shown to the opposite extreme, gears 142 and 143 will be rotated in the directions shown by the arrows (FIG. 9), and each of these gears will drive their respective primary and secondary gear trains to turn the spindles in two X rows. Gears 146 and 147 do not mesh with the racks 150 and 151. FIGURE 10 illustrates the relationship between the drive gear 142 of one X row and the gears 146 in an adjacent X row. Gears 144 have not been shown in FIG. 10 in order to clarify the drawing.

It will be remembered from the above description that base assembly 26 is movable relative to base assembly 28. To avoid gear interference when base assembly 26 is moved along the Y axis, gears 144 and 146 adjacent the base assembly 28 are relieved as are the corresponding gears 145 and 147 adjacent base assembly 26 and such relief is designed at 148 in FIG. 9. Approximately one half of the teeth have been removed on each of the gears adjacent the edge 38. However, the number of teeth removed from these gears need only be sufficient to avoid interference when one base assembly is moved relative to the other. It can be seen from FIGS. 9 and 10 that each spindle turns in a direction opposite to that of an adjacent spindle in either of the two coordinate rows, as is required for the core threading operation.

Although there have been shown and described several mechanisms for rotating the core spindles, it is not intended that these mechanisms be in any way a limitation since there are other mechanisms which may be used.

*Operation of the Core Winding Apparatus*

The manner in which the core winding apparatus is used to wind magnetic core memory arrays will now be described. This description will be concerned with the threading of a magnetic core plane in which each core has three apertures. This core configuration is selected as best suited to illustrate the numerous facets of the invention and is not contemplated as a limitation on the core configuration that may be threaded.

The windings required in the illustrated plane are the bias winding, composed of B1, B2 and B′ filaments, the inhibit or Z windings, the Y coordinate select or Y-select winding, the X coordinate select or X-select winding and the sense or S winding. Filaments B1, B2, B′, Z and Y-select are to be inserted along the Y coordinate, and the remaining two filaments, X-select and S, are to be inserted along the X coordinate.

Referring to FIGS. 1 and 3, the alignment block 46 is placed in the position shown and clamp 40 is tightened against flange 30 of element 84 to hold base assembly 26 in the proper alignment with base assembly 28. The X rows of spindles in assembly 26 are to be aligned with their corresponding X rows in assembly 28. Core spindles 24 are all turned so that the guide fingers 70 and 72 of each spindle are in alignment in the X direction, as shown. Guide piece 92 is placed in position over the tops of the core spindles with the grooves 94 of the guide piece being placed downward, preparatory for subsequent threading operations. Fence 96 is placed in position over the guide piece 92 so that its attached brackets 98 and 99 are at the ends of grooves 94 of the guide piece. A quantity of cores 60, in excess of the actual number used, is placed on the upper surface of the guide piece. Vibrator 160 and vacuum pump 87 are started and operated concurrently to seat the loose cores in their individual spindles. Fence 96 is used to retain the cores in the proximity of the spindles during core seating. After a limited period of operation, determined by experience with the particular core configuration used, the vibrator is stopped and a check is made to insure that each spindle holds a properly positioned core. Hand placement of some cores may be necessary. Fence 96 is temporarily removed and the excess cores are brushed aside. It may be noted, however, that all cores may be inserted by hand or by agitating the cores by hand while operating the vacuum pump alone. Spacers 104 and auxiliary divider strips 106 are not present under guide piece 92 during the core seating, but will be inserted later.

After the cores have been placed within the spindles, the entire winding fixture may be removed from the vibrating device to a convenient work place. Vacuum may be used during the entire winding operation to aid in maintaining the cores in the spindles as they are being threaded with the necessary filaments. With the fence 96 again in place as shown in FIG. 1, pin blocks 100 and 101 having pins 102 and 103 attached thereto, are placed in their respective brackets 98 and 99 at the Y ends of the fence 96. Pin block 100 is inserted so that pin 103 coincides with edge 38 on base assembly 28. The function of the pins is to preserve an excess length of filament during threading so there will be sufficient filament to permit core rotation without possible damage to the filament. Pin 103 in pin block 100, is placed farther from the fence 96 than the remaining pins 102 so that as the filaments pass around it a greater excess of filament is preserved to permit base assembly 26 to be freely moved relative to base assembly 28 at a later time. A pin 102 or 103 is necessary between adjacent rows; in the embodiment shown, a 16 x 16 core spindle matrix, seven pins are necessary on the left end and eight pins are necessary on the right end of the Y rows. Spindle matrices of other sizes, of course, will require a different number of pins.

Figure 12:
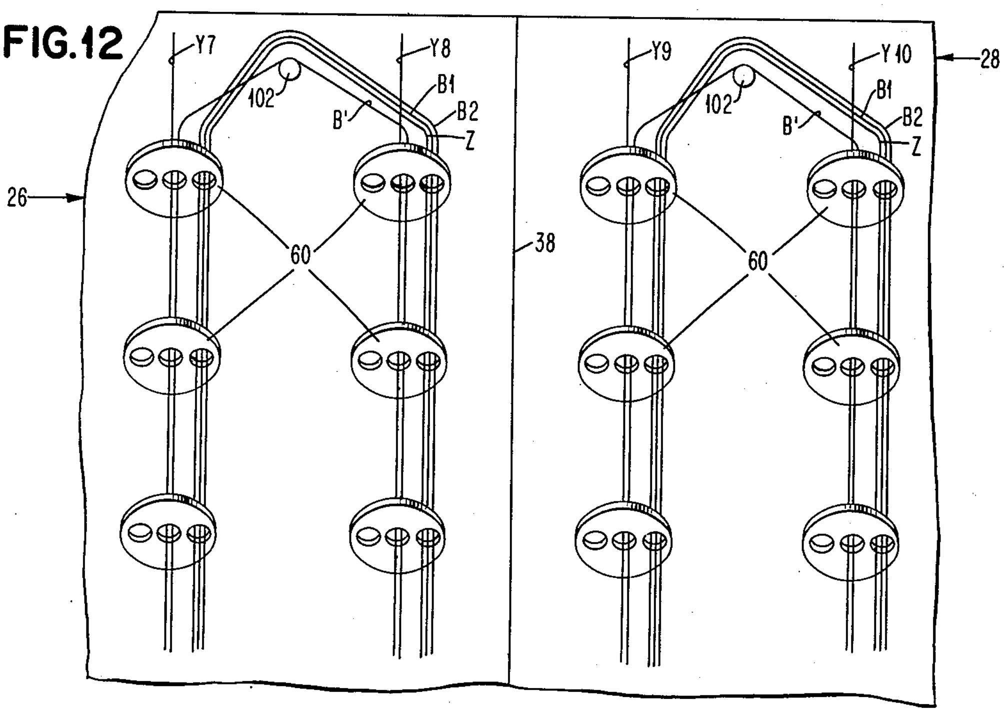
FIGURE 12 is a diagrammatic view schematically illustrating the relationship of the cores before rotation and with the windings partially complete.

The cores are now ready to be threaded with the appropriate filaments or windings. In the illustrated embodiment with cores having three apertures, three filaments are placed in the lowermost hole of each core. The filaments comprise the B1 and B2 bias windings and a Z inhibit winding as shown in FIG. 12. A predetermined length of wire 76 has attached at each end a needle 74, although only a single needle is shown in FIG. 1. Beginning at the two Y rows adjacent edge 38 at the left end of fence 96, a needle is passed through grooves 94 of the guide piece for each of these rows and the filament is drawn through so that the approximate mid-point of the filament contacts pin 103. A needle is passed through the lowermost aperture in each core in each of these two rows. The needle emerging from Y row 8 is then returned about pin 102 between rows 7 and 8 through row 7 on base assembly 26, the needle being passed back and forth through the rows in base assembly 26 in descending order (to the left as shown), and about pins 102 between adjacent rows. The needle and filament used to thread Y row 9 are likewise passed back and forth in zigzag fashion through Y rows 9–16 in ascending order, each time passing a filament around pins 102 at the ends of the rows. Since, in this embodiment, a B2 wire and a Z wire must be added, they are threaded in a manner identical to the B1 wire just described. At this point, each core should have three wires passing through its bottom aperture and the entire sixteen Y rows should be connected by each of the three windings in zigzag fashion. The cores are now ready to have the windings placed in the center apertures.

As a step preliminary to threading the center apertures, slots 94 in guide piece 92 must be placed in alignment with those apertures. This is done by raising the entire combination of guide block 92, fence 96, and pin blocks 100 and 101. The combination need be raised only a slight amount to permit the positioning of spacers 104 between adjacent X rows. The spacers are positioned with care so as not to damage windings already in place in the bottom aperture of each core. The combination of guide piece, fence and pin blocks may be entirely removed, if found desirable. Spacers 104 are selected such that their thickness brings the grooves of guide block 92 into alignment with the center apertures of the cores. If the selection of spacers 104 is limited, the optional auxiliary divider strips 106, described above, may be inserted at right angles to and under the spacers. The thickness of the auxiliary divider strips will, of course, depend on the distance spacers 104 are to be raised. The use of auxiliary divider strips 106 is advantageous because these strips will depress the already threaded filaments toward the surfaces of plates 78 and 79 to avoid possible entanglement in future threading. The combination of guide piece, fence and pin blocks is lowered onto spacers 104 after the spacers have been properly positioned between the rows of spindles. The B′ bias wire is now threaded through the Y rows of cores in the same manner as was done with the B1, B2 and Z windings placed in the lowermost aperture of each core. A second wire required in the center aperture of each core is the Y-select winding. An individual Y wire is threaded through each row and the wire should be of a sufficient length to extend beyond each end of the Y rows to allow for subsequent core rotation. The order in which the Y-select wires are placed in the rows of cores is of no consequence since each Y row is to contain an individual wire. The core spindles are now ready for a rotation of 90 degrees. The threading of the filaments up to this point and the relationship of the spindle base assemblies 26 and 28 during this threading are shown in FIG. 12.

The combination of guide piece, fence and pin blocks is now removed from the apparatus. Care should be exercised in removing the windings contactings pins 102 and 103 so that the wires are damaged as the pins are raised. Next, spacers 104 are removed, and if auxiliary divider strips 106 are used, they are also removed. Core rotation may be accomplished by any of the above-described means, namely, the key, the pinions and racks, or the gear trains. As before-mentioned, any appropriate means may be used to rotate the cores 90 degrees. In this particular core winding illustration, the desired configuration of the remaining windings is accomplished by turning, for example, spindle 25 (FIG. 1) in a counterclockwise direction and then turning each successive adjacent spindle along each coordinate in a direction opposite to the one just turned. Should the pinions and racks or gear train mechanisms be used, each spindle will properly turn when the racks are actuated. It will be remembered that the excess length of the filaments necessary for turning the spindles will come from the surplus provided when the filaments were threaded around pins 102 and 103. The direction of rotation of the core spindles will be determined by the configuration of the windings which it is desired to thread through the core apertures. The cores are now ready for the next step in threading.

The remaining windings to be placed through the cores in this illustrative core array, are the X-select windings for each X row and the S or sense winding; the X-select windings are to be placed through the center apertures of the cores and the S winding through the top apertures. The sequence in which these last two windings are placed through their respective core apertures is optional. If the X-select wires are installed in each X row prior to the installation of the S wire, spacers 104 and grooves 94 of guide piece 92 may be used for threading, but the X wires will be drawn around the edges of the center apertures in the cores adjacent the edge 38 of base assembly 28 as base assembly 26 is reciprocated. When the S winding is threaded prior to the X winding, the guide piece cannot be lowered for alignment with the center apertures of the cores without possible entanglement or damage to the S winding. However, in the latter case, the S winding would not be drawn around the edges of the apertures as frequently, but the number of times would increase only progressively as the S winding was installed.

Figure 13:
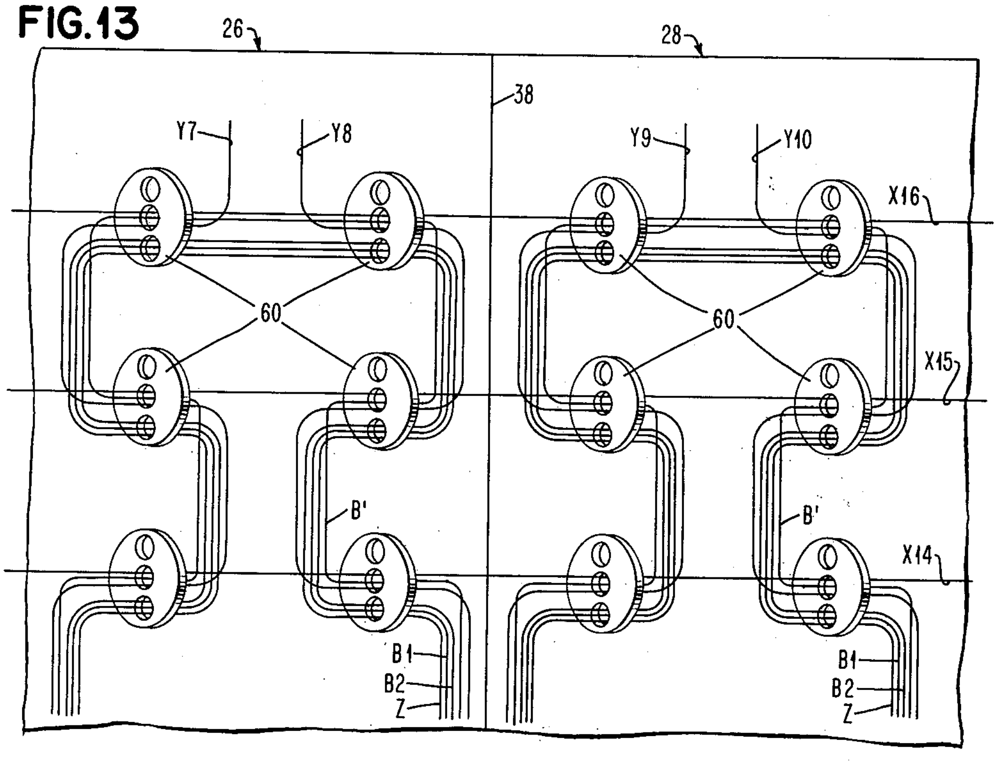
FIGURE 13 is a diagrammatic view schematically illustrating the relationship of the cores after rotation and with the windings partially complete.

For the purposes of this illustration, the X-select windings will be described as installed first, followed by the installation of the S winding. After the cores have been rotated as just described, auxiliary divider strips 106, if they are used, may be placed between adjacent rows of spindles in the X direction. Spacers 104 are placed over the divider strips and parallel to the Y axis. The divider strips and spacers function as shims to properly locate guide piece 92 with its grooves 94 in alignment with the center apertures of each core. Guide piece 92 is rotated 90 degrees from the position shown in FIG. 1 and positioned on the core spindles in contact with spacers 104. The X-select windings, sixteen in this instance, are then threaded through the individual rows in the X direction in a manner similar to that used in threading the Y-select windings. The structure of an individual spindle and its relation with spacers and divider strips at this stage are shown in FIG. 11. Needle 74 is shown emerging from the center aperture of core 60. Note that divider strips 106 may rest on the wires already in the bottom aperture and support spacers 104. Guide piece 92 is removed and divider strips 106 and spacers 104 are withdrawn upon completion of the threading of the X-select windings. A partially complete core memory array is illustrated in FIG. 13. In this figure, the cores have been rotated 90 degrees and the X winding has been threaded through the center apertures of the individual cores. The sense winding may now be installed in the top apertures of the cores.

The threading of the S or sense winding will be explained in conjunction with FIGS. 14–16. In accordance with the usual practice, the wire is preferably threaded through the cores in a figure eight pattern in order to cause half select signals to cancel each other when the core planes are operated in a memory unit. The core winding apparatus is adapted to this type of sense winding configuration by constructing the apparatus in two base assemblies 26 and 28, one of which is movable with respect to the other. Alignment block 46 (FIG. 1) must first be lifted from its channel and turned 90 degrees and the clamp 40 loosened so that base assembly 26 is free to move. Fence 96, pin blocks 100 and 101, pins 102 and 103, and guide piece 92 are not generally used to guide needle 74 when threading the sense winding through the cores. However, the guide piece may be adapted for use, if so desired, by adding another X row of holes 93 at one Y end or the other as viewed in FIG. 1. With the additional X row of holes, the guide piece can then be installed when base assembly 26 is displaced one row in either direction from the position shown in FIG. 1. When the guide piece is used, it must be removed and replaced for each row in which the sense wire is threaded. Spacers 104 and divider strips 106, when used, should be removed each time base assembly 26 is moved in order to free the windings already installed for movement through the core apertures.

Figure 14:
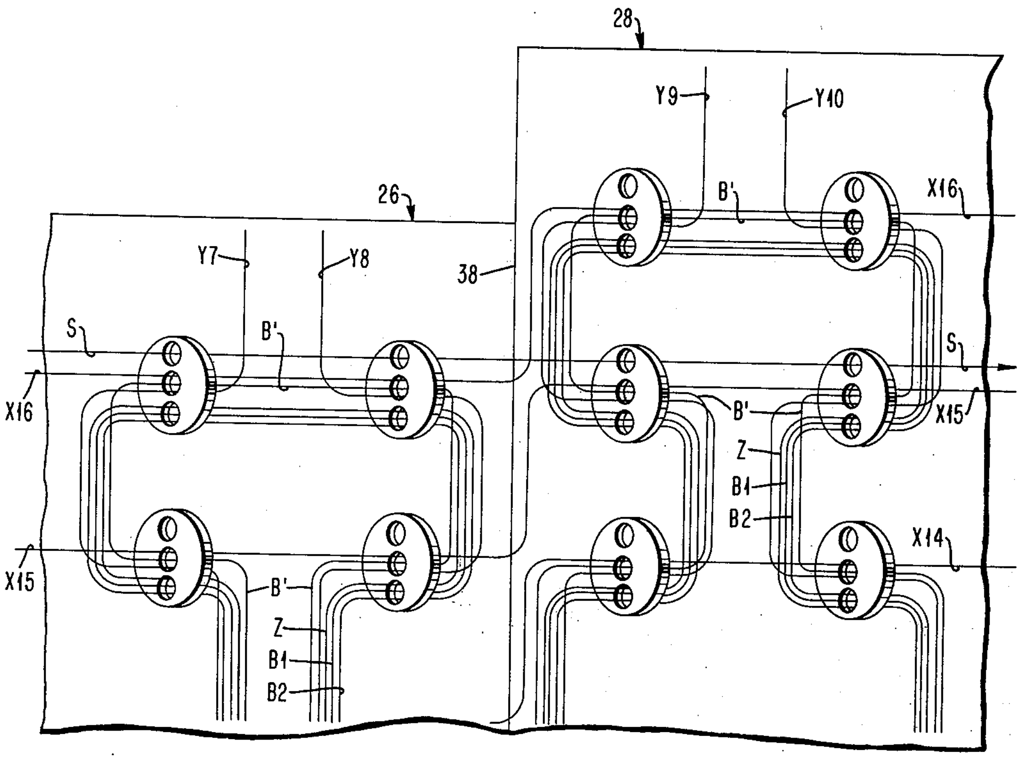
FIGURES 14–16 are additional diagrammatic views schematically illustrating the threading of a sense winding through a core plane.
Figure 15:
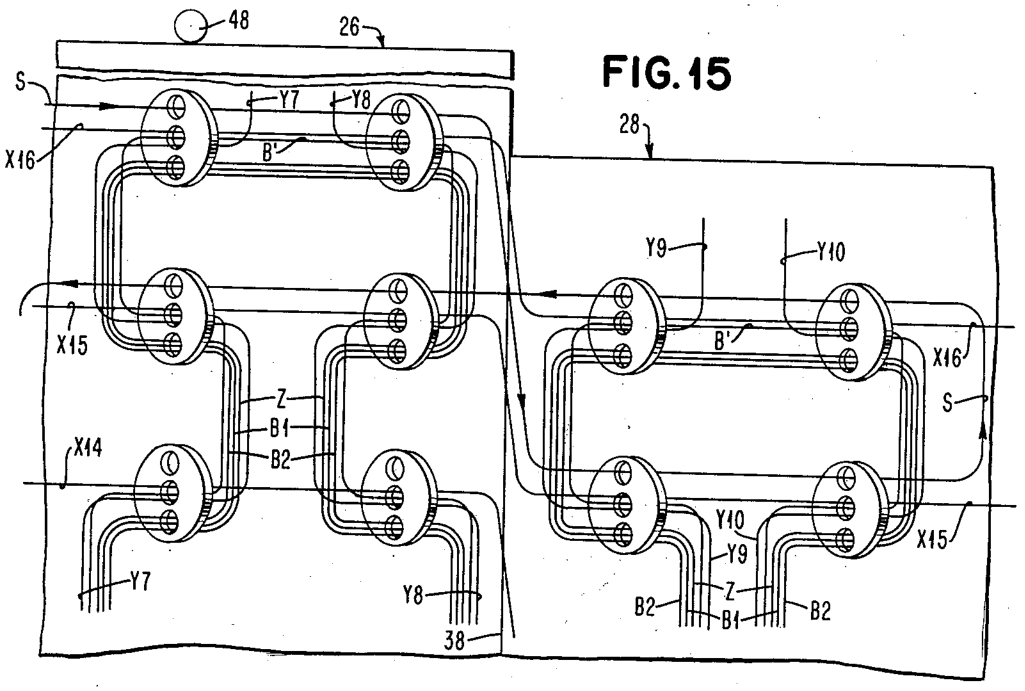

Referring now to FIG. 14, base assembly 26 is displaced (downwardly in the figure) against block 46 (not shown) so that row X16 of base assembly 26 is in alignment with row X15 of base assembly 28. Base assembly 26 is clamped in this position. Needle 74, to which a length of filament is attached, can then be threaded through the uppermost apertures of the first eight cores of row X16 on base assembly 26 and through the corresponding apertures of the last eight cores of row X15 of base assembly 28 in a single pass. Upon completing the pass of the S winding through row X16 of base assembly 26 and row X15 of base assembly 28, base assembly 26 is moved (upward in FIG. 15) against limit stop 48 fixed in plate 22, FIG. 1, and clamped as described hereinabove. Limit stop 48 is so positioned that row X15 of base assembly 26 is in alignment with row X16 of base assembly 28. The S winding is returned through the uppermost apertures of the cores in rows X16 and X15 of the two base assemblies 28 and 26, respectively, as shown. Base assembly 26 is moved to its lower position or against alignment block 46 where the sense wire can be passed through the first half of row X14 of base assembly 26 and the last half of row X13 of base assembly 28. Sense wire threading is continued in the same manner just described for the remaining rows in the core array, that is, completing a figure eight pattern for each two rows and reciprocating base assembly 26 between its two alignment stops 46 and 48. This procedure results in half of the cores being threaded in one sense and the remaining half of the cores being threaded in an opposite sense on the common S winding, whereby, when the core plane is used, partial excitation of the nonselected cores in each sense is cancelled. It is obvious that the sequence in which the rows are threaded with the S winding may be varied to achieve other desired configurations for this winding.

Figure 16:
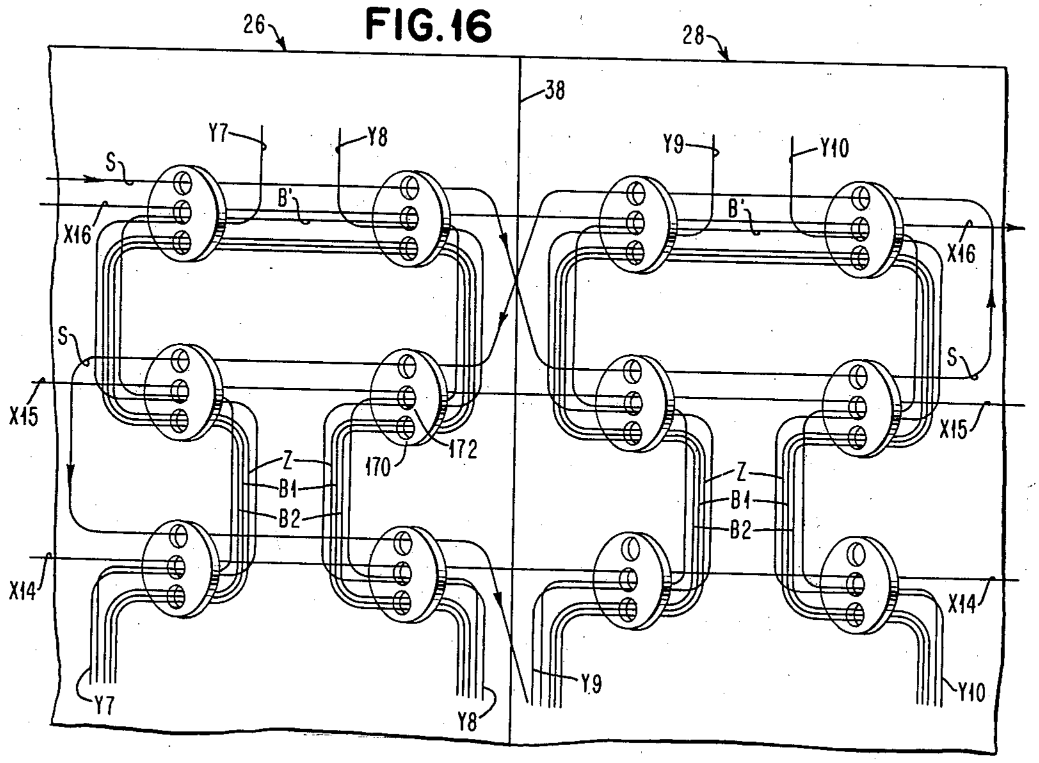

A partial core array is shown in FIG. 16 as it appears when all the windings just described have been completed. After the sense winding has been completely threaded through the cores in the array, base assembly 26 is realigned so that its X rows are aligned with corresponding X rows of base assembly 28 for removal of the completed core plane.

As mentioned above, the X-select windings may be threaded subsequently to the S winding. When this sequence is used, the two base assemblies 26 and 28 are realigned to form normal X rows after the S winding has been threaded. This sequence of threading does not permit the use of guide piece 92 because of the presence of the S winding already in place in the uppermost core apertures. However, spacers 104 and divider strips 106 may be advantageously employed. Spacers 104 are inserted below the S winding in the uppermost aperture. By raising the spacers to lift the S winding, divider strips 106 may bet inserted between the spacers and the B′ and Y-select windings to depress the latter two windings to the bottom of the center core apertures. Spacers 104 are held in the raised position while individual X-select windings in turn are threaded through the center apertures of the cores in the X rows by needle 74. The matrix of the subject embodiment requires sixteen X-select windings. Upon completing the insertion of these windings, the spacers and divider strips are carefully removed to avoid damage to any windings. It is not necessary to use these spacers and divider strips for threading the X-select winding since this winding may be threaded by guiding the needle by hand. The resulting core array assembled by this latter sequence appears, of course, as that shown in FIG. 16.

The core array may be completed by interconnecting the several windings in appropriate circuits and attaching the ends of the windings to the proper terminals on a core frame or supplementary jig prior to removal of the completed core array from the rotating spindles. A core frame may be a rigid frame similar in configuration to fence 96 but of smaller dimensions, both as to the size of the structural elements and as to the size of the enclosed area. The frame has terminals along its periphery to which the ends of the windings are attached and to which the external control circuits may also be connected. When a completed core plane and frame have been assembled, the array may easily be installed as one of many planes in a memory unit.

The bias winding of the illustrated embodiment includes the B1, B2 and B′ windings described above. Upon completion of the threading operations and during the final installation of the core array in its frame, one end of the B′ winding is connected to one end of the B1 winding and the other end of the B′ winding is connected to one end of the B2 winding. The remaining ends of the B1 and B2 windings are attached to separate terminals on the core frame to thus provide a single bias winding similar to a figure eight pattern about the lowermost core legs 170 and the adjacent core leg 172 of the cores shown in FIG. 16.

The remaining windings, X-select, Y-select, Z inhibit and S sense, are connected to suitable independent terminals on the core frame to permit the proper selection and sensing of the core. Neither the actual connection of the control filaments nor the number and arrangement of these filaments form any part of this invention. Furthermore, fewer or additional windings may be used, depending upon the desired function of the magnetic core memory array; in this view, it is anticipated that the bias windings may be omitted, or for instance, a clear or reset winding may be supplied.

It is contemplated that the invention described herein can be adapted for the threading operation of cores requiring varying numbers and arrangements of control filaments and for threading magnetic cores having one, two, three, or more apertures symmetrically or asymmetrically located within the core itself. It is also contemplated that the subject device may be adapted for cores of varied contours, regular and irregular. For example, guide fingers 70 and 72 may be formed as a single member to support the core along a lower edge leaving more of the core exposed and to permit access to apertures near the periphery of the core. Interchangeable guide pieces 92 may be provided having grooves of different contours or location in each guide piece to conform with a particular series of apertures in the cores.

While the invention has been particularly shown and described with reference to a preferred embodiment thereof, it will be understood by those skilled in the art that the foregoing and other changes in form and details may be made therein without departing from the spirit and scope of the invention.

I claim:

1. A device for supporting apertured magnetic cores for assembly with filaments inserted through the apertures of said cores to form a core plane, comprising a base plate, and a plurality of support members individually rotatably mounted on said base plate on axes normal to said base plate, the axes being located at the intersections of coordinate lines, each of said support members having means for holding a core thereon in a position with the core aperture exposed for insertion of filaments therethrough parallel to the surface of the base plate, said support members being rotatable from a position in which the apertures of the cores thereon are aligned along the coordinate lines in one direction to a position in which said apertures are aligned along the coordinate lines in the other direction.

2. A device for supporting apertured magnetic cores for assembly with filaments inserted through said apertures to form a core plane, comprising a base, a plurality of support members individually rotatably mounted on said base on axes normal to said base, the axes being located at the intersections of coordinate lines, each of said support members having means for holding a core thereon in a position with the core aperture exposed for insertion of filaments therethrough parallel to the surface of the base, and means to rotate said support members from a position in which said apertures are aligned along coordinate lines in one direction to a position in which said apertures are aligned along the coordinate lines in the other direction.

3. A device for supporting apertured magnetic cores for assembly with filaments insered through said apertures with a needle to form a core plane, comprising a base plate, a plurality of support members individually rotatably mounted on said base plate on axes normal to said base plate, the axes being located at the intersections of coordinate lines, each of said support members having means for holding a core thereon in a position with the core aperture exposed for insertion of filaments therethrough parallel to the surface of said base plate, means for rotating said support members from a position in which the apertures of the cores thereon are aligned along the coordinate lines in one direction to a position in which said apertures are aligned along the coordinate lines in the other direction, and guide means adjacent said support members having aligned guide surfaces between said support members for guiding said needle and said filaments through said apertures and adapted to be aligned with said apertures when the latter are aligned in either of said directions.

4. Apparatus for supporting apertured magnetic cores for inserting a needle and filaments through said apertures in first and second coordinate directions to form a core plane, comprising a base plate, a plurality of support members individually rotatably mounted on said base plate on axes normal to said base plate, the axes being located at the intersections of first and second coordinate lines, each said support member having means for holding a core thereon in a position with the core aperture exposed for insertion of filaments therethrough parallel to the surface of said base plate, means to rotate said support members to align said core apertures in rows parallel to said first coordinate and in rows parallel to said second coordinate for the insertion of said needle and said filaments through said rows of core apertures along either said first or said second coordinate directions, and guide means adjacent said support members having surfaces thereon for forming guide channels between said core apertures for said needle and filaments when said apertures are aligned in rows along either of said first or said second coordinates.

5. Apparatus for supporting apertured magnetic cores for inserting a needle and filaments through said core apertures in first and second coordinate directions to form a core plane, each said core having a plurality of apertures corresponding with apertures of the other cores, comprising a base plate, a plurality of support members individually rotatably mounted on said base plate on axes normal to said base plate, the axes being located at the intersections of first coordinate and second coordinate lines, each of said support members having means for holding a core thereon in a position with the core aperture exposed for insertion of filaments therethrough parallel to the surface of said base plate, means to rotate said support members to align said core apertures in rows parallel to said first coordinate and in rows parallel to said second coordinate for the insertion of said needle and said filaments through said apertures along either said first or second coordinates, guide means adjacent said support members having surfaces thereon for forming guide channels for said needle and filaments between core apertures in said rows in either coordinate direction, and shimming means between said base plate and said guide means to align said surfaces of said guide means with particular corresponding apertures in each core.

6. A device for supporting apertured magnetic cores for assembly with filaments inserted through the apertures of said cores to form a core plane, comprising a base plate, a plurality of support members individually rotatably mounted on axes normal to said base plate, the axes being located at the intersections of coordinate lines, each said support member having means for holding a core thereon in a position with the core aperture exposed for insertion of filaments therethrough parallel to the surface of said base plate, and means for simultaneously rotating a first group of said plurality of support members in a clockwise direction and a second group of said plurality of support members in a counterclockwise direction from a position in which the apertures of said cores thereon are aligned along the coordinate lines in one direction to a position in which said apertures are aligned along the cordinate lines in the other direction.

7. The method of assembling a plurality of magnetic cores and a plurality of coordinate windings to form a magnetic core array, each said core having at least one aperture therein, comprising the steps of supporting each of said cores on individual rotatable supporting members of a plurality of said members being relatively positioned to form a matrix of first and second coordinate intersecting rows, each said member being common to two of said intersecting rows, rotating said members to align said core apertures in a first coordinate direction, threading first coordinate windings through said core apertures, rotating selected ones of said plurality of supporting members in a clockwise direction and the others of said plurality in a counterclockwise direction to align said threaded core apertures in a second coordinate direction, and threading second coordinate windings through said core apertures so that each said core is threaded with said first and second coordinate windings to form a core memory array.

8. The method of assembling a plurality of magnetic cores with a plurality of coordinate windings to form a magnetic core array, each said core having at least one aperture therein, comprising the steps of supporting each of said cores on individual supporting members of a plurality of said members relatively positioned to form a matrix of intersecting first and second coordinate rows with each said member common to two of said intersecting rows, rotating said members to align the apertures of said cores in rows in a first coordinate direction, aligning temporary parallel filament guide channels between said members interconnecting said core apertures in each said first coordinate row, threading first coordinate filaments through said guide channels and each core aperture in each said first coordinate row, rotating selected ones of said plurality of members in one direction and the others of said plurality of members in an opposite direction to align the apertures of said cores in rows in a second coordinate direction, aligning temporary parallel filament guide channels between said members interconnecting said core apertures in each said second coordinate row, and threading second coordinate filaments through said guide channels and each core aperture in each said second coordinate row so that each said core is threaded with said first and second coordinate filaments to form a core memory array.

9. The method of assembling a plurality of magnetic cores and a plurality of coordinate windings to form a magnetic core array, each said core having at least one aperture therein, comprising the steps of supporting each of said cores on individual rotatable supporting members relatively positioned to form a matrix of first and second coordinate intersecting rows with each said member common to two of said intersecting rows, rotating said supporting members in each said coordinate row to align said core apertures in a first coordinate direction, threading first coordinate windings through said core apertures, rotating adjacent supporting members in each said coordinate row in opposite directions to align said core apertures in a second coordinate direction, and threading second coordinate windings through said core apertures so that each said core is threaded with first and second coordinate windings to form a core memory array.

10. The method of assembling a plurality of magnetic cores with a plurality of filaments to form a magnetic core memory array, each said core having at least two apertures therein, comprising the steps of supporting each of said plurality of cores on individual rotatable support members of a plurality of said members arranged in intersecting first and second coordinate rows, with each said member being common to two of said intersecting rows, rotating said members to align said core apertures in rows parallel to said first coordinate, aligning temporary parallel filament guide channels between said members interconnecting corresponding first apertures of each said core in each said first coordinate row, inserting at least one filament through said guide channels and each of said corresponding first apertures in each first coordinate row, rotating each of said members oppositely relative to adjacent members to align said core apertures in rows parallel to said second coordinate, aligning temporary parallel filament guide channels between said members interconnecting corresponding second apertures of each said core in each said second coordinate row, and inserting at least one filament through said guide channels and each of said corresponding second apertures in each said second coordinate row so that each core is threaded with intersecting filaments to form a core array.

References Cited in the file of this patent

UNITED STATES PATENTS

| | | |
|---|---|---|
| 1,289,607 | Batchelder | Dec. 31, 1918 |
| 2,958,126 | Shaw et al. | Nov. 1, 1960 |